(12) United States Patent
Luo et al.

(10) Patent No.: US 10,649,899 B2
(45) Date of Patent: May 12, 2020

(54) MULTICORE MEMORY DATA RECORDER FOR KERNEL MODULE

(71) Applicant: INTEL CORPORATION, Santa Clara, CA (US)

(72) Inventors: Sai Luo, Beijing (CN); Tin-Fook Ngai, San Jose, CA (US); Hu Chen, Beijing (CN); Xiaocheng Zhou, Beijing (CN); Chunxiao Lin, Beijing (CN); Kang Zhao, Beijing (CN)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 15/505,879

(22) PCT Filed: Sep. 25, 2014

(86) PCT No.: PCT/CN2014/087447
§ 371 (c)(1),
(2) Date: Feb. 22, 2017

(87) PCT Pub. No.: WO2016/045059
PCT Pub. Date: Mar. 31, 2016

(65) Prior Publication Data
US 2017/0255560 A1 Sep. 7, 2017

(51) Int. Cl.
*G06F 12/00* (2006.01)
*G06F 12/0842* (2016.01)
(Continued)

(52) U.S. Cl.
CPC .......... *G06F 12/0842* (2013.01); *G06F 11/36* (2013.01); *G06F 11/3632* (2013.01);
(Continued)

(58) Field of Classification Search
CPC combination set(s) only.
See application file for complete search history.

(56) References Cited

U.S. PATENT DOCUMENTS

| 9,558,118 B2 | 1/2017 | Pokam et al. |
| 9,875,108 B2 | 1/2018 | Pokam et al. |

(Continued)

FOREIGN PATENT DOCUMENTS

| CN | 103020003 A | 4/2013 |
| WO | 2013147898 A1 | 10/2013 |

OTHER PUBLICATIONS

State IP Office of the P.R. China, The International Search Report and the Written Opinion of the International Searching Authority, for PCT/CN14/87447; dated Jun. 26, 2015, pp. 1-9.
(Continued)

*Primary Examiner* — Yong J Choe
(74) *Attorney, Agent, or Firm* — Lowenstein Sandler LLP

(57) ABSTRACT

A processing device includes a processing core, coupled to a memory, to execute a task including a code segment identified as being monitored and a kernel recorder, coupled to the processing core via a core interface. The kernel recorder includes a first filter circuit to responsive to determining that the task being executed enters the code segment, set the kernel recorder to a first mode under which the kernel recorder is to record, in a first record, a plurality of memory addresses accessed by the code segment, and responsive to determining that the execution of the task exits the code segment, set the kernel recorder to a second mode under which the kernel recorder is to detect a write operation to a memory address recorded in the first record and record the memory address in a second record.

20 Claims, 12 Drawing Sheets

(51) Int. Cl.
  *G06F 11/36* (2006.01)
  *G06F 12/0831* (2016.01)
  *G06F 12/0875* (2016.01)

(52) U.S. Cl.
  CPC ...... *G06F 12/0831* (2013.01); *G06F 12/0833* (2013.01); *G06F 12/0875* (2013.01); *G06F 2212/1016* (2013.01); *G06F 2212/1032* (2013.01); *G06F 2212/452* (2013.01); *G06F 2212/621* (2013.01)

(56) References Cited

U.S. PATENT DOCUMENTS

| | | |
|---|---|---|
| 2008/0222364 A1 | 9/2008 | Blumrich |
| 2009/0031290 A1 | 1/2009 | Feng et al. |
| 2011/0320745 A1 | 12/2011 | Zhang et al. |
| 2012/0272022 A1 | 10/2012 | Wang et al. |
| 2014/0089642 A1 | 3/2014 | Gottschlich et al. |
| 2014/0189256 A1 | 3/2014 | Kranich et al. |

OTHER PUBLICATIONS

European Extended Search Report for EP14902388.9, dated Mar. 21, 2018, 8 pages.
Pokam, Gilles, et al., "QuickRec: Prototyping an Intel Architecture Extension for Record and Replay of Multithreaded 3rograms," ISCA 13 Tel Aviv, Israel, ACM 978-1-4503-2079—May 13, 2006, 12 pages, 2013.
Pokam, Gilles, et al., "Architecting a Chunk-based Memory Race Recorder in Modem CMPs," Micro'09, New York, NY, USA, ACM 978-1-60558-798—Jan. 9, 2012, pp. 10, Dec. 12-16, 2009.

MULTICORE MEMORY DATA RECORDER FOR KERNEL MODULE

TECHNICAL FIELD

The embodiments of the disclosure relate generally to processing devices and, more specifically, relate to a hardware memory data recorder to record transactions occurring at the kernel level in a multicore and multithreaded environment.

BACKGROUND

Computing devices include ever increasing number of processing cores. As the number of processing cores increases, high-performance computing (HPC) application software ("application") and even driver software ("driver") utilize increasing number of threads to perform tasks. Computer applications may be roughly divided into user applications and system applications. The user applications are computer software that may cause a computer to perform tasks other than running the computer itself. The system applications may include computer software that may be used to operate the computer. System applications may include drivers which are computer programs to control hardware devices. A driver may enable operating systems and applications to interact with hardware devices without needing to know the details of the hardware configuration. One or more processing cores may carry out the execution of computer applications in threads, each of which may be the smallest sequence of programmed instructions that may be handled independently by the operating system. However, more threads tend to create more data race conditions in a memory shared by multiple applications or threads. A data race condition may occur when two or more threads try to access a shared memory location. Data race conditions may be non-deterministic because the data content stored at the shared memory location depends on the thread scheduling algorithm. These non-deterministic data race conditions are hard to reproduce during the subsequent debug process.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
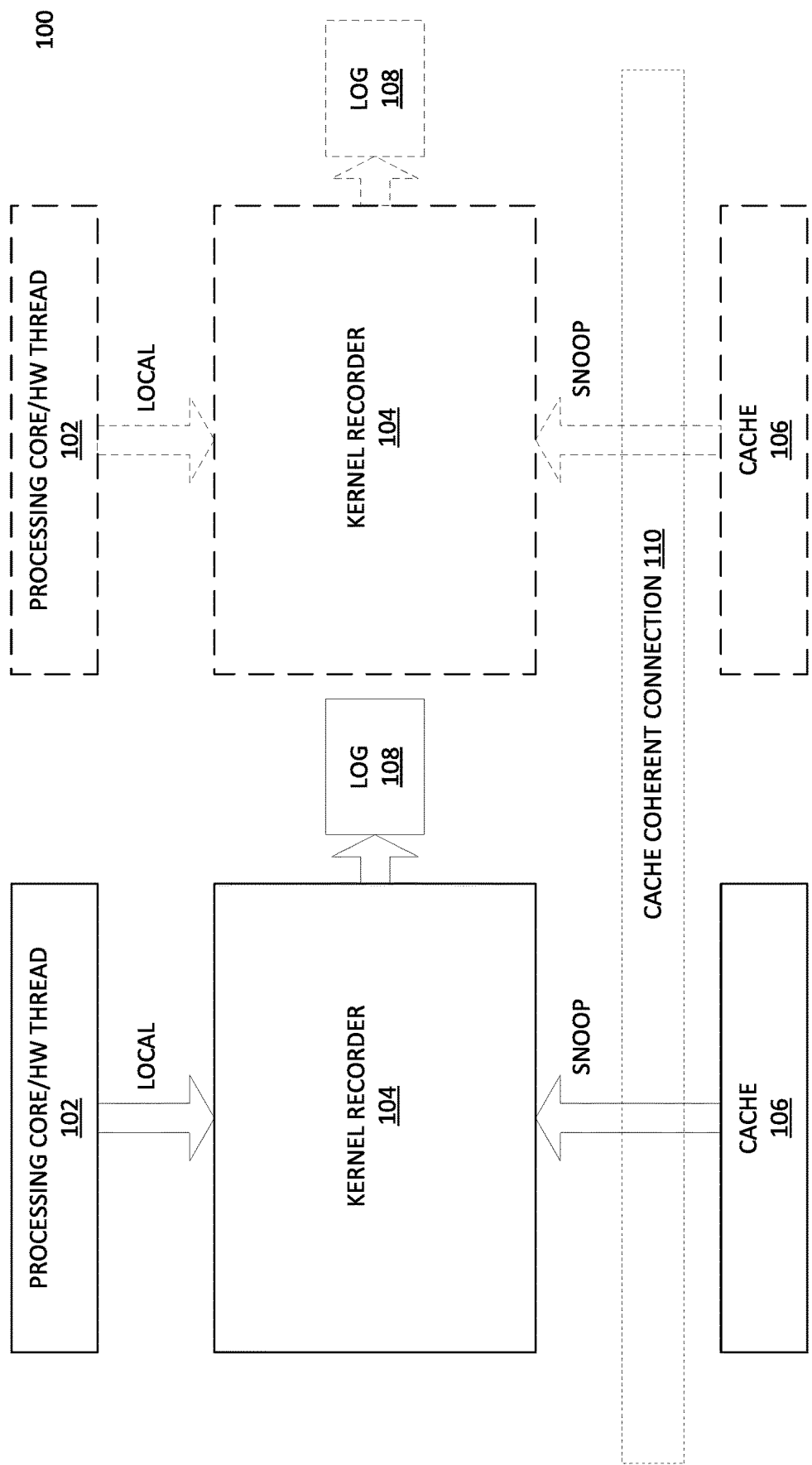
FIG. 1 illustrates a processing device including a kernel recorder according to an embodiment.

When multiple instances of one or more computer programs access a shared memory, the content of the memory may depend on the sequence of the execution of these instances, leading to unpredictable outcomes for the one or more computer programs (also known as race conditions). The instances of computer programs are referred to as tasks hereinafter for convenience. To analyze and debug the non-deterministic race conditions, a Memory Race Recorder (MRR), coupled to a processing core and cache, may record the potential race conditions by monitoring the activities in the memory or snooping. Snooping is a part of a cache coherency protocol where the individual caches monitor messages (cache snoop messages) indicating accesses to memory locations that they can cache. When a write operation from other cores is observed to a memory location at which a cache has a copy, a cache controller invalidates its own copy of the snooped memory location.

The MRR assumes that every write operation causing potential data race can be properly captured. However, in certain implementations, the MRR may ignore certain types of write operations such as write operations outside a monitored code segment. The write operations that are ignored by MRR may be referred to as "silent" write operations. This assumption by MMR may be valid to certain extent for user applications since a user application run as a task separate from the task of another application and from the kernel of the operating system because data race condition might happen only inside this user application. Exceptions to the assumption may include the access of a memory location shared by two or more processes. Further, this assumption of no "silent" writes may not be valid for drivers because they run in the same context of kernel and other drivers with high privilege level to access memory.

Embodiments of this disclosure may include circuit logic that detects both "non-silent" writes generated by the monitored code (such as user applications and monitored drivers) and "silent" writes generated by non-monitored code (such as the kernel and drivers of the operating system). Thus, embodiments of the disclosure may record the normal and the "silent" memory race conditions created by drivers and operating system kernels, and the "silent" inter-process data race conditions in memory shared between processes.

Embodiments of the disclosure may include a hardware kernel recorder (KR) coupled to a processing core via a core interface and further coupled to a cache to record non-deterministic data race conditions so that the non-deterministic data races may be replayed during the debug process. When multiple cores execute a computer application, data race conditions may occur with respect to the shared memory. For example, data race conditions may happen when a read operation to a memory location by one thread follows a write operation to the same memory location by another thread, or a write operation to a memory location by a thread follows a read operation to the same memory location by another thread, or a write operation to a memory location by a thread follows another write operation to the same memory location by another thread. All these pairs of read/write (or write/read, or write/write) operations may cause non-deterministic results or data race conditions at the shared memory.

Since these data race conditions occur during the execution of a task, they are referred to as internal data race conditions. Similar data race conditions (such as read/write, write/read, or write/write) may also occur when two or more programs are executed on many cores as threads and try to access a same memory location. For example, a data race condition may occur when a read operation to a memory location by a thread executing a first program follows a write operation to the same memory location by another thread executing a second program. These types of data race conditions caused by the execution of two programs may be referred to as outside data race conditions because they are caused by threads of execution from outside programs.

Non-deterministic data race conditions are those that may produce different results for each run of the same transaction, where a transaction is a group of CPU operations that access the memory. Thus, a transaction may be carried out by multiple threads on multiple cores in different orders. The non-deterministic data race conditions could have been caused by executing a same transaction by multiple cores because each run of the transaction may follow different sequential order and thus create different non-deterministic factors. Additionally, different amount of input/output (I/O) delays and I/O values may also contribute to the non-deterministic factors. Since non-deterministic memory race conditions are hard to reproduce, all these data race conditions need to be recorded so that they may be replayed deterministically to debug the multi-thread execution of threads.

FIG. 1 illustrates a processing unit 100 that may record different types of memory accesses to cause non-deterministic data race conditions according to an embodiment of the disclosure. Referring to FIG. 1, processing unit 100 may be part of a core or a system-on-a-chip (SoC) fabricated on a single substrate (or a single die). For example, processing unit 100 may be one of many cores within a CPU. Processing unit 100 may include a processing core 102, a kernel recorder 104, and cache 106. Processing unit 100 may optionally include a log buffer 108.

Processing core 102 may include circuit logics to receive and execute program instructions. Kernel recorder 104, coupled to processing core 102, may include circuit logics to record deterministic and non-deterministic factors including special instructions (such as the Read Time Stamped Counter (RDTSC) instruction) and inputs (such as I/O instructions), data race conditions within the codes of a program that is being monitored, and data race conditions from outside of the monitored program codes. In this way, kernel recorder 104 may record not only data race conditions within a user application, but also data race conditions caused from outside of the user application such as those from drivers and/or other user programs. In one embodiment, kernel recorder 104 may include a code filter to identify codes that are being monitored and codes that are not being monitored.

In one implementation, the segment of programming code may be identified by a user input (e.g., with marker code) or by a compiler as the code should be monitored for data race conditions. The monitored segment of programming code is referred to as the code under recorded (CUR). During execution of the programming code, responsive to receiving a code whose instruction pointer (IP) is within the range of the code under recorded (CUR), kernel recorder 104 may switch to a Record-and-Replay (RR) mode. Kernel recorder 104 may further include a data filter that under the RR mode, may record data associated with the code that potentially may cause data race conditions. Kernel recorder 104 may further include local buffers that responsive to the identification of potential data race conditions, record data for the code under recorded and a global buffer to record data that are monitored with write operations from codes that are not under recorded (e.g., external writes).

For a code that is outside the range of CUR, responsive to the code being identified as not being recorded, kernel recorder 104 may switch to a Non-Record-and-Replay (NonRR) mode. Under NonRR mode, kernel recorder 104 may record data write operations by processing core 102 in the global buffer since the data write by processing core 102 may potentially cause data race conditions. Kernel recorder 104 may use the global buffer to record and detect the data race conditions from the code that is not being recorded.

Cache 106 may be coupled to kernel recorder 104 via a shared bus 110 (or any other cache coherent connection). Cache 106 may record a copy of the data stored in the shared memory location. Any data change at the shared memory location may be detected by the cache coherency protocol. The data change at the shared memory location may be caused by another computer application (other than the current CUR) executing on the same core or on another core (remote core) that has access to the shared memory. Each core may include a cache controller (not shown) that monitors updates to cache lines in the cache (e.g., L1 cache) that is local to processing core 102. The updates of cache lines may be caused by an access to a location corresponding to the cache lines at the shared memory by processing core 102. Subsequent to the update of a cache line, a snooping element (not shown) may broadcast a snoop message on shared bus 110 to notify other processing cores about the update at the memory location.

Referring to FIG. 1, the kernel recorder 104 may monitor snoop messages from shared bus 110. Although as shown in FIG. 1, the kernel reorder 104 resides between the local core/cache and the external bus/cache, the kernel recorder 104 may also reside between the local core and the local cache. Responsive to receiving a snoop message indicating an update at a location in the shared memory, kernel recorder 104 may check the CUR codes and the data associated with the CUR code and Non-CUR codes to determine whether a data race condition occurs (a data race condition may occur when two or more threads try to access a shared memory location). In the event that a data race condition is determined to have occurred in the shared memory, the execution of the monitored/non-monitored codes may be stalled (and may be resumed later), and the information recorded in the buffers inside kernel recorder 104 may be exported to the log buffer 108.

In one embodiment, log buffer 108 may be a hardware buffer with limited size. The content of log buffer 108 may be further exported to external memory and be used in a replay during the debug process to determine the cause of the data race conditions at the shared memory.

In this way, embodiments of the disclosure may record kernel/driver data races and user program data race due to shared memory races by other processes.

Figure 2:
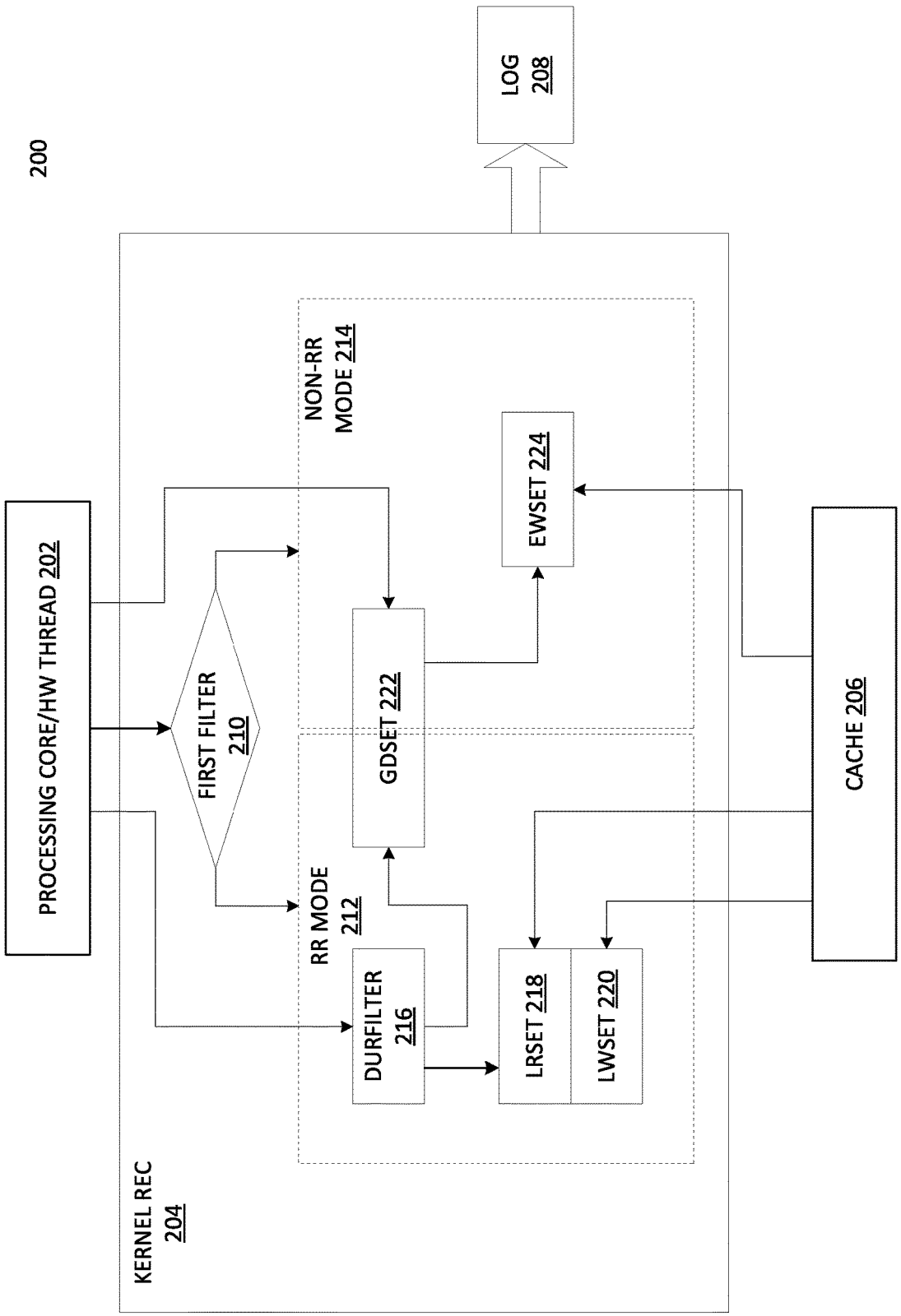
FIG. 2 is a detailed illustration of a processing device including a kernel recorder according to an embodiment.

FIG. 2 illustrates a detailed processing unit 200 that may record different factors that may cause non-deterministic data race conditions (a non-deterministic data race condition occurs when the data content stored at the shared memory location depends on the thread scheduling algorithm) according to an embodiment of the disclosure. Referring to FIG. 2, the processing unit 200 may include a processing core (or a hardware thread) 202, a kernel recorder 204, cache 206, and a log buffer 208. These components are similar to those as described in FIG. 1.

In one embodiment, the processing core 202 may execute threads of instructions according to a schedule generated by a scheduler of the operating system. Each thread may be part of the execution of a task—either user applications or system applications (such as the kernel of an operating system and drivers).

Each processing core (or hardware thread) inside the processing unit 200 may include one instance of kernel recorder 204 that include circuit logics to record all deterministic and non-deterministic factors. The kernel recorder 204 may be coupled to processing core 202 and cache 206, and monitors transactions from both sides. Thus, the kernel recorder 204 may receive from processing core 202, via a core interface, transactions executed on processing core 202, including memory read and write transactions and microarchitecture information such as the current Instruction Pointer (IP) of the transaction. Kernel recorder 204 may also receive, from cache 206, snoop messages (messages transmitted among processing cores and cache for monitoring cache activities) such as any data updates in the shared memory.

In one embodiment, a processing core may feature multiple hardware threads may expressly use to achieve hyperthreading. In this scenario, kernel recorder 204 may receive instructions and data from a hardware thread of processing core 202. Since each hardware thread may function as a processing core, each hardware thread may be associated with a kernel recorder. Thus, for the convenience of discussion, processing core 202 may represent both a processing core and a hardware thread hereinafter.

In one embodiment, kernel recorder 206 may operate in two modes, depending on the instructions being executed on processing core 202. When processing core 202 is to execute the Code Under Recorded (CUR) codes (or codes within an identified code segment), the kernel recorder 204 may switch to a first mode of a record-and-replay (RR) mode 212. As discussed before, CUR codes are segments of programming code (or code snippets) identified to be monitored (e.g., a function or the whole user program) where data race conditions due to these codes should be recorded, and a replay of these codes should be deterministic (i.e., a replay of what had happened). A CUR code can be as small as a single instruction that may cause data race conditions, or a line of high level language source code, or one or more functions, or one or more drivers that contain functions, or kernel parts, or code residing the ring 0 kernel space, or code residing the whole ring 3 user space and ring 0 kernel space.

When processing core 202 exits the execution of the CUR codes, kernel recorder 204 may switch to a second mode of a non-recorder-and-replay (NonRR) mode 214. The exit from CUR codes may happen when processing core 202 returns the execution to a caller of the CUR codes, or calls to a Non-CUR function, or is interrupted.

In one embodiment, kernel recorder 202 may include a first filter circuit 210 (referred to as CUR filter 210 hereinafter) that is coupled to the processing core via a core interface (not shown) to determine whether a code being executed by processing core 202 is a CUR code or not, and cause kernel recorder 204 to enter either RR mode 212 or Non-RR mode 214 based on the result of the determination. When kernel recorder 204 receives information about the code being executed by processing core 202, CUR filter 204 may first receive the information and determine whether the code is a CUR code.

In one embodiment, CUR filter 210 may be a circuit that may compare the instruction pointer (IP) of the code received at its input with a specified range (e.g., a base+offset pair) to determine if the code is part of CUR codes. In another embodiment, the CUR code may be specified by multiple ranges (e.g., multiple base+size pairs) which may be suitable for multi-functions or multi-drivers. In an alternative embodiment, CUR filter 210 may be implemented as an inverse filter(s) where only codes that are not covered by range(s) (or base+size pairs) are considered as CUR codes. In another alternative embodiment, CUR filter 210 functionality may be implemented by software. For example, drivers may include modified entry, exit, and interrupt points that may send command to hardware to switch between RR/NonRR modes.

Responsive to a determination by CUR filter 210 that the code being executed by processing core 202 is a CUR code, kernel recorder 202 may switch to RR mode. Responsive to a determination by CUR filter 210 that the code being executed by processing core 202 is not a CUR code, kernel recorder 202 may switch to NonRR mode.

In one embodiment, each CUR filter 210 may store in a mode status register (not shown) of not only the mode of the local kernel recorder 204, but also modes of kernel recorders of remote processing cores. In one embodiment, each CUR filter 210 may be coupled to a mode status register including bits that each indicates the mode of a kernel recorder. For example, a "1" at a first bit location may indicate RR mode for a first kernel recorder, and a "0" at the first bit location may indicate NonRR mode for the first kernel recorder. In one embodiment, on detecting a local mode change at a first kernel recorder, the first CUR filter of the first kernel recorder may broadcast a message (e.g., using Inter-Processor Interrupt (IPI), or any other mechanism) which may include an identification of the processing core associated with the first kernel recorder. Upon receiving the message, the CUR filter of the kernel recorder associated with a second processing core may update the corresponding local Mode Status Register to reflect the changes of the first kernel recorder. In an alternative embodiment, modes of kernel recorders of remote cores may be transmitted through cache snoop messages. For example, each snoop message may include an additional bit to identify the mode of the sender. For example, a "1" of the additional bit may indicate the RR mode, and a "0" may indicate the NonRR mode at the remote core. Thus, each kernel recorder may keep a record of the modes of all kernel recorders in the Mode status register.

In one embodiment, the kernel recorder 204 may further include a data under record (DUR) filter 216. Under RR mode, CUR codes may manipulate data. For example, a CUR code may move data to the main memory that may be shared by multiple processing cores. DUR filter 216 may be a logic circuit that may receive data from processing core 202 under the RR mode and identify which data might be monitored. In one embodiment, DUR filter 216 may identify a datum that should be recorded because it is associated with code that is likely to have data race condition. For example, DUR filter 216 may identify data associated with a locked variable (a variable identified by a compiler to be protected by a lock) in a program as one that should be monitored. In other embodiments, DUR filter 216 may identify the data section of a loaded driver, or the data section and the stack section of the loaded driver, or any data if read or written by CUR codes, or any data excluding certain ranges.

Similar to CUR filter 214, DUR filter 216 may be implemented as circuit logic that detects an address range of data (e.g., base address+offset size), or multiple ranges of data (e.g., multiple base+range pairs), or as an inverse filter. Further, DUR filter 216 may also be implemented as a Bloom Filter to test if data should be monitored. The Bloom filter is a probabilistic data structure that is used to test whether an element is a member of a set.

In one embodiment, kernel recorder 204 may further include a global data set (GDSet) logic 222 that may include a controller to identify the data set ever passing through DUR filter 216 that needs to be recorded in a GDSet data record. The recorded data set may include the data and the memory addresses of the data. Under the RR mode, when the CUR code manipulates new data which passes through DUR filter 216, but is not in the data record of the GDSet-logic 222, an address of the new data is then added to GDSetdata record. During a record session (or the execution of the code under recorded), the size of data stored in GDSetdata record increases as data are added to it. The data may be recorded at different levels of details or granularity. For example, the data can be recorded as pages or chunks of bytes. The granularity of data added to GDSetdata record may be a trade-off. On one hand, the granularity of data stored in GDSetdata record should be large enough to cover all the accessed data during a record session without causing an overflow since large granularity means that fewer memory addresses need to be recorded. On the other hand, the granularity of data stored on GDSetdata record should be small enough to keep the occurrences of false positive (i.e., data that are never accessed but are covered by a memory address in GDSetrecord) relatively small. This tradeoff may depend on the usage. For example, if the CUR code to be debugged is a driver module, CUR filter 210 may be set to that driver's code section, DUR filter 216 may be set to that driver's data section, and GDSetdata record may use page address granularity since driver's code and data section are naturally page aligned. In one embodiment, GDSetdata record may be a memory buffer containing a set of page addresses. In another embodiment, GDSetdata record may be a Bloom filter containing a set of cache line addresses, etc.

In one embodiment, kernel recorder 204 may include a circuit logic that may monitor transactions by the local processing core, and add appropriate memory addresses to GDSetdata record. In another embodiment, a page fault handler—a software application—may add memory addresses to GDSetdata record.

In one embodiment, GDSet data record is synchronized across all processing cores either by hardware (e.g., by monitoring the snoop messages from remote cores in RR mode) or by software (e.g., identifying the IPI interrupt sent from page fault handler of remote cores in RR mode). The synchronization means that the address data stored in a first GDSet data record may be shared with other GDSet data records of other processing cores.

In one embodiment, kernel recorder 204 may further include a Local Read Set (LRSet) buffer 218 and a Local Write Set (LWSet) buffer 220 for recording data and memory address of the data under the RR mode. LRSet buffer 218 may contain memory address range ever read by the local processing core 202 since the last LRSet buffer flushes. Similarly, LWSet buffer 220 may contain memory address range ever written to by the local processing core 202 since the last LWSet buffer flushes. Under RR mode, if the kernel recorder 204 detects a read transaction by the local processing core which is covered by DUR filter 216, a controller (not shown) may add the address of the read data to the LRSet buffer 218. If kernel recorder 204 detects a write transaction by the local processing core which is covered by DUR filter 216, the controller may add the address of the write data to the LWSet buffer 220.

The address data stored in LRSet buffer 218 and LWSet buffer 220 may be used to detect data race conditions. In one embodiment, if kernel recorder 202 detects that a read transaction in a snoop message generated from one or more remote cores that are under the RR mode (remote cores are cores other than the local core 202 coupled to the kernel recorder 204) hits an address of the main memory contained LWSet 220, a Read-After-Write (RAW) data race has occurred which may trigger the kernel recorder 204 to add a new entry to the log 208 and flush (i.e., clear) LRSet buffer 218 and LWSet buffer 220 for a next recording. If kernel recorder 204 detects in snoop messages that a read for ownership (RFO) (a read operation that claims ownership at a memory location for subsequent write operations) or a write transaction hits an address of the main memory contained in LRSet 218 or LWSet 220, a write-after-read (WAR) or a write-after-write (WAW) data race has occurred which may trigger the kernel recorder 204 to add a new entry (WAR or WAW) to the log and flush LRSet buffer 218 and LWSet buffer 220.

In one embodiment, kernel recorder 202 may further include an external write set (EWSet) buffer 224 that may, under the NonRR mode, capture all the data writes from NonCUR code to the CUR code's data set so that kernel recorder 202 may capture data race conditions between NonCUR code and CUR code. Under NonRRmode, if the kernel recorder 204 detects that a local write transaction hits an address stored in the GDSet 222 which is a potential data race condition caused by the NonCUR code, the address and data of the write transaction may be added to the EWSet buffer 224. In one embodiment, the EWSet buffer 224 may act like cache. For example, if the kernel recorder 204 detects that a snoop message from a remote core under the RR mode hits an address stored in EWSet buffer 224, the hit entry in EWSet buffer 224 may be evicted to log 208.

In one embodiment, the size of the EWSet buffer 224 may be limited. Therefore, when the EWSet buffer 224 is full, either all or part of the entries in the EWSet buffer 224 may be evicted. A replacement policy may determine which entries are to be evicted. In one embodiment, the EWSet buffer 224 may be organized as cache or memory structure, or may directly reuse existing cache (e.g., by adding a bit to identify that an entry belongs to the EWSet 224), or can be implemented as a Bloom filter with a notification to the snoop transaction sender to save the value at the sender side.

In one embodiment, the kernel recorder 204 may further include a log buffer 208 to store information of data race conditions. Log buffer 204 may be partially implemented in the kernel recorder 204 as a hardware buffer with limited size. When log buffer 208 is full, the content of log buffer 208 may be dumped to an external memory. The log buffer 208 may include enough information so that CUR codes could be replayed later in a deterministic way. For example, data stored in log buffer 208 may include the reason of data race conditions, a number of executed instructions in this block, time counter for ordering, micro-architecture information due to out-of-order execution and instruction atomic violation.

In one embodiment, the kernel recorder 204 may be designed to detect data race conditions relating to a driver. For example, the kernel recorder 204 may detect data race conditions within a driver, and between a driver and other components of an operating system kernel. In one embodiment, the entry and exit points of functions and interrupt handlers associated with the driver may be instrumented so that a software application may identify when a processing core enters and exits the execution of the driver. The kernel recorder 204 may enter into the RR mode if the software application determines that the processing core 202 enters into execution of the driver, and kernel recorder 204 may exit the RR mode and enter NonRR mode if the software application determines that the processing core 202 exits execution of the driver. The software application may broadcast the change of kernel recorder mode via IPI protocol to other processing cores. Kernel recorder 204 may include a Mode status register implemented as a bitmask register having N bits (N=the number of processing cores), each bit indicating the mode of a processing core. A bit value of "1" at a bit location may indicate the execution of a CUR code at the corresponding processing core (either local or remote core) under the RR mode. In one embodiment, the DUR filter may be an all-pass filter (or not implemented) so that any data associated with the execution of the CUR code may be added to GDSet data record which may contain an array of page addresses. LRSet buffer 218 and LWSet buffer 220 may be implemented as Bloom filters, and EWSet buffer 224 may contain an array of addresses and data stored at the addresses. In this way, data race conditions associated with the driver may be detected and recorded for later replay.

Figure 3:
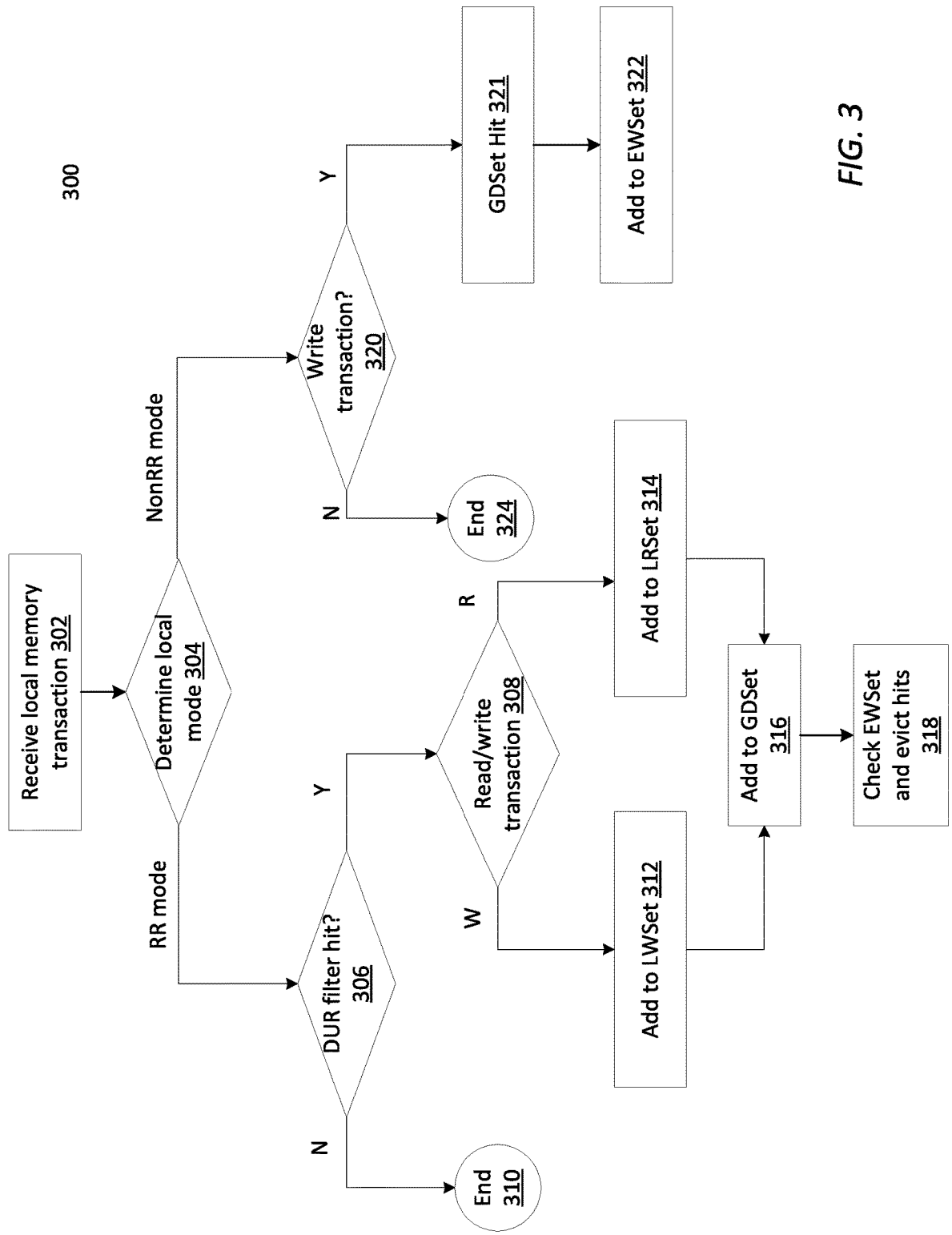
FIG. 3 is a diagram of a method to use a kernel recorder to record memory transactions according to an embodiment.

FIG. 3 is a block diagram of a method 300 to process memory transactions executed at the local processing core according to an embodiment. Method 300 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 300 may be performed, in part, by processing logics of any one of the kernel recorders 104, 204 described above with respect to FIGS. 1, 2.

For simplicity of explanation, the method 300 is depicted and described as a series of acts. However, acts in accordance with this disclosure can occur in various orders and/or concurrently and with other acts not presented and described herein. Furthermore, not all illustrated acts may be performed to implement the method 300 in accordance with the disclosed subject matter. In addition, those skilled in the art will understand and appreciate that the method 400 could alternatively be represented as a series of interrelated states via a state diagram or events.

Referring to FIG. 3, at 302, a kernel recorder may receive a memory transaction from the local processing core to which the kernel recorder is associated with. Upon receiving the memory transaction, at 304, a CUR filter may determine the mode of the processing core. The CUR filter may determine whether the IP of the memory transaction is within the specified range of CUR codes. In response to a determination that the IP is within the range, the kernel recorder may switch to the record-and-replay (RR) mode. On the other hand, in response to a determination that the IP is outside the range, the kernel recorder may switch to the non-record-and-replay (NonRR) mode.

Under the RR mode, at 306, a DUR filter may determine if data associated with the memory transaction may be monitored for data race conditions in the memory. In response to a determination that the data belongs to the types that should not be monitored for data race conditions (e.g., the data belong to the types that do not cause data race), at 310, no further processing of the data is needed. However, in response to a determination that the data belongs to the types that likely cause data race conditions, at 308, a controller in the kernel recorder may further determine if the memory transaction is a read or write transaction. At 314, the controller may add the address of the data of the read transaction to a LRSet buffer, or at 312, the controller may add the address of the data of the write transaction to LWSet buffer. Further, at 316, the controller may check if the memory address is already in GDSet data record or not. If it is not, the controller may add the memory address to the GDSet data record as a new entry. Further, at 318, this memory transaction is checked in an EWSet buffer to determine if there is a hit in the EWSet buffer. In response to a determination that there is a hit in the EWSet buffer, the hit may cause EWSetentry to be evicted (i.e., the content of the EWSetentry is output) to a log buffer. Thus, a data race condition may be recorded.

Under the NonRR mode, at 320, the kernel recorder may monitor write transactions. In response to a determination that there is no write transaction, at 324, no further processing is needed. In response to a determination that there is a write transaction, it is furthermore checked against GDSet at 321. If there is a miss in GDSet, no further processing is needed. If there is a hit in GDSet, the write transaction may be added to the EWSet buffer at 322. The EWSet buffer may store both the data and the memory address.

Figure 4:
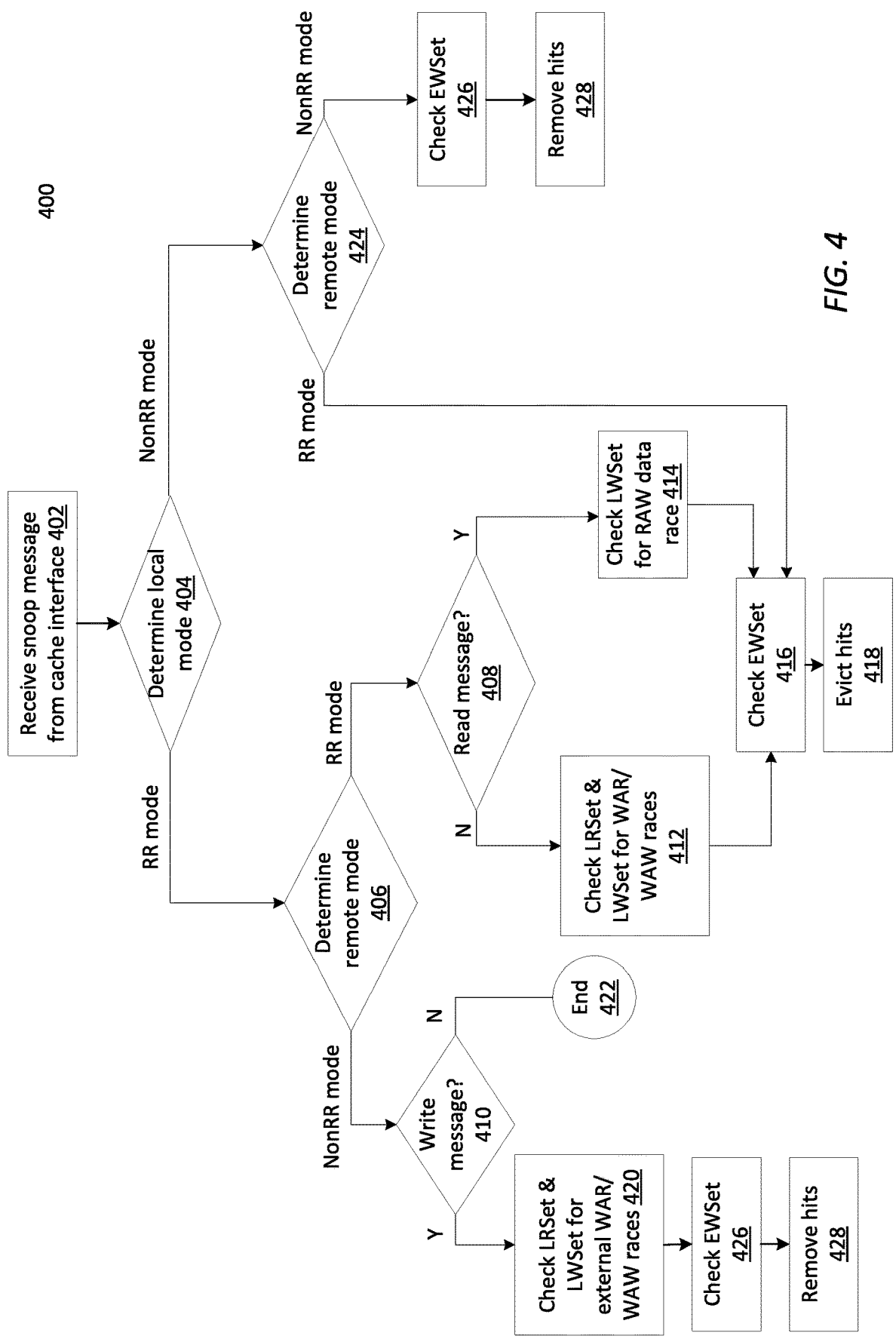
FIG. 4 is a block diagram of a method to monitor snoop messages from a cache interface according to an embodiment.

FIG. 4 is a block diagram of a method to monitor snoop messages from a cache interface according to an embodiment. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of any one of the kernel recorders 104, 204 described above with respect to FIGS. 1, 2.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, a kernel recorder may receive a snoop message from a shared bus (or any other cache coherent connection) that implements a cache interface. The shared bus may be coupled to a main memory shared by multiple processing cores each of which may include a respective cache. Thus, responsive to an update at the shared memory, a snoop message may be generated to inform all processing cores (or all processing cores that have cached copy of that to-be-updated data item) of the update so that each processing core may check their respective cache for cache hits and misses. Since each processing core may access the shared memory, the snoop message may be generated by the local processing core or by a remote processing core (processing cores other than the local processing core). In one embodiment, each snoop message may include a processing core identification that may indicate which processing core generates the snoop message.

At previously discussed, kernel recorder may include a mode status register that may indicate whether each processing core is running under the RR mode or NonRR mode. Responsive to receiving a snoop message, at 404, a controller of the kernel recorder may determine the mode of the kernel recorder by looking up the bit in the mode status register corresponding to the local processing core.

Responsive to a determination that the kernel recorder of the local processing core operates under the RR mode, at 406, the controller may further determine the mode of the remote processing core that originates the snoop message. The controller may make the determination of the mode of the remote core by looking up the mode status register based on the processing core identification contained in the snoop message. Responsive to a determination that the remote processing core operates under the RR mode, at 408, the controller may determine if the snoop message indicates a read operation at the share memory. Responsive to a determination that the snoop message indicates a read operation by the remote processing core, at 414, the controller may check with the LWSet and LRSet buffer to detect if there is an internal read after write (RAW) data race condition. Responsive to detecting a RAW data race condition (i.e., a hit in LWSet buffer), the controller may add a new entry recording the RAW data race condition in a log buffer and flush LWSet buffer. Responsive to a determination that the snoop message indicates a write operation (or a read for ownership operation), at 412, the controller may cause to check with LWSet buffer to detect if there is an internal write after write (WAW) data race condition, or cause to check with LRSet buffer to detect if there is an internal write after read (WAR) data race condition. Responsive to detecting either WAW or WAR data race condition, the controller may add a new entry to the log buffer to record the WAW or WAR data race condition, and then flush the LWSet and LRSet buffer.

In one embodiment, responsive to the determination that the remote processing core operates under the RR mode, at 416, the controller may also check the snoop message against EWSet buffer to determine if there is a data race condition after an external write operation. Responsive to a determination that the internal read or write operation that generated the snoop message causes a data race condition with an external write recorded in the EWSet buffer at 416, the controller may cause to evict the EWSet buffer and record the hit in the log buffer at 418.

Responsive to a determination that the remote processing core operates under the NonRR mode, the controller may determine if the snoop message indicates a write operation at the share memory by the remote processing core. Responsive to a determination that there is not a write operation by the remote processing core, at 422, no further processing is needed. Responsive to a determination that the snoop message indicates a write operation on the share memory by the remote processing core, at 420, the controller may check LRSet buffer to detect if there is WAR data race condition, and check LWSet buffer to detect if there is WAW data race condition. Responsive to the detection of WAR or WAW data race condition, the controller may record the data race condition in the log buffer and flush the LRSet buffer and LWSet buffer. In one embodiment, at 426, the controller may further check the EWSet buffer to determine if there is a hit entry recorded in the EWSet buffer. Responsive to a determination that there is a hit record for the write operation indicated by the snoop message, at 428, the controller may remove the hit entry from the EWSet buffer since the data race condition caused by the external write operation has been processed, and the EWSet at the remote core would hold the latest value of this write operation.

Responsive to a determination that the local processing core operates under the NonRR mode, at 424, the controller may further determine the mode of the remote processing core that originates the snoop message. Responsive to a determination that the remote processing core operates under the RR mode, at 416, the controller may check the snoop message with the EWSet buffer to detect the data race conditions of an internal read/write after an external write operation. Responsive to a hit, the controller may evict the corresponding entry in the EWSet buffer to record the data race condition in the log buffer. Responsive to a determination that the remote processing core operates under the NonRR mode—a situation of external read/write which is not a concern, at 426, the controller may check the EWSet buffer to detect if there is a hit. Responsive to there is a hit in the EWSet buffer, at 428, the controller may remove the hit entry from the EWSet buffer since the EWSet at the remote core would hold the latest value of this write operation. In this way, bother internal and external data race conditions may be recorded.

Figure 5A:
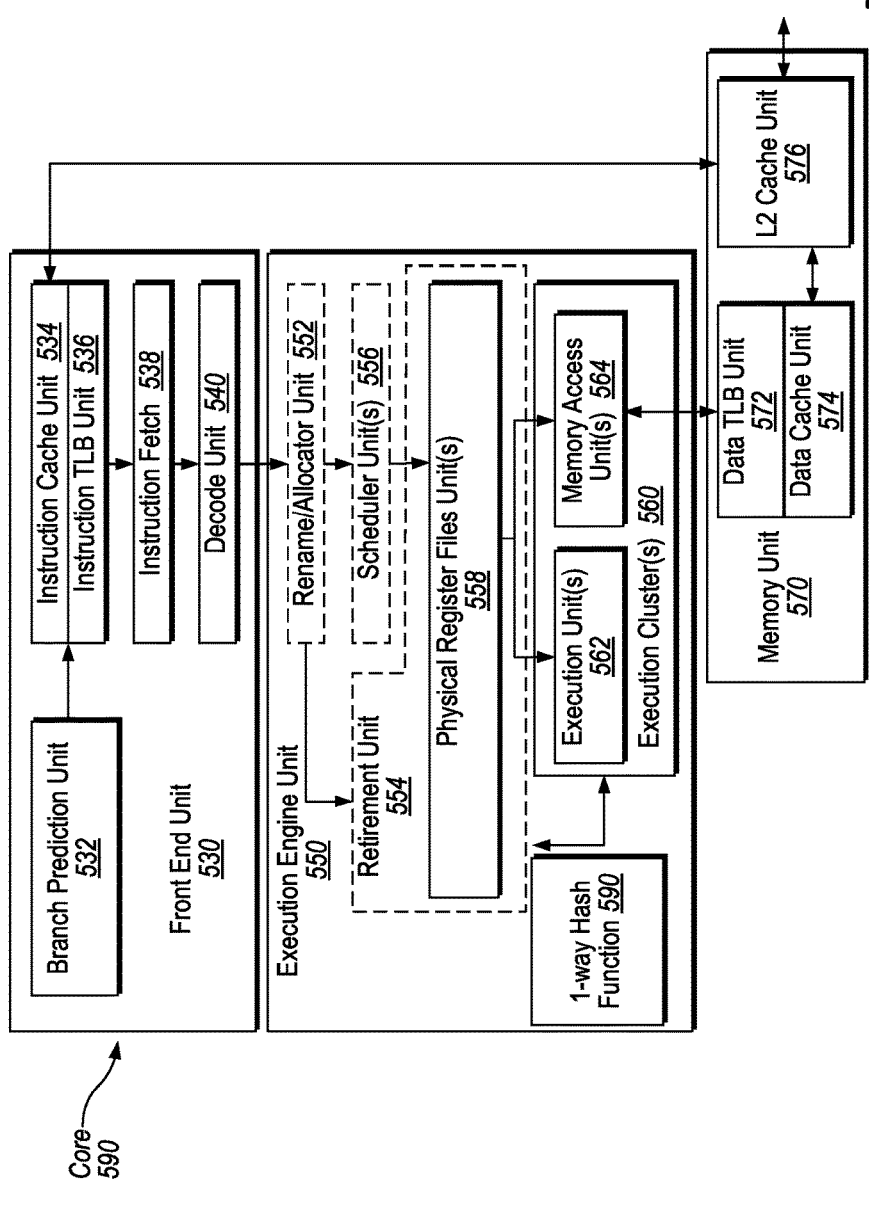
FIG. 5A is a block diagram illustrating a micro-architecture for a processor including heterogeneous core in which one embodiment of the disclosure may be used.

FIG. 5A is a block diagram illustrating a micro-architecture for a processor 500 that implements the processing device including heterogeneous coresin accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multicore processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as the processing devices 100, 200 described with respect to FIGS. 1 and 2.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5B:
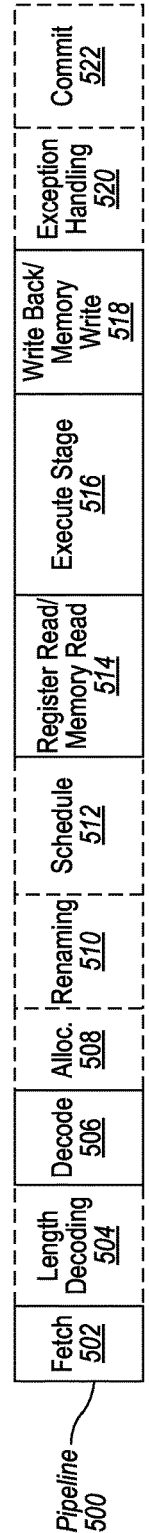
FIG. 5B is a block diagram illustrating an in-order pipeline and a register renaming stage, out-of-order issue/execution pipeline implemented according to at least one embodiment of the disclosure.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
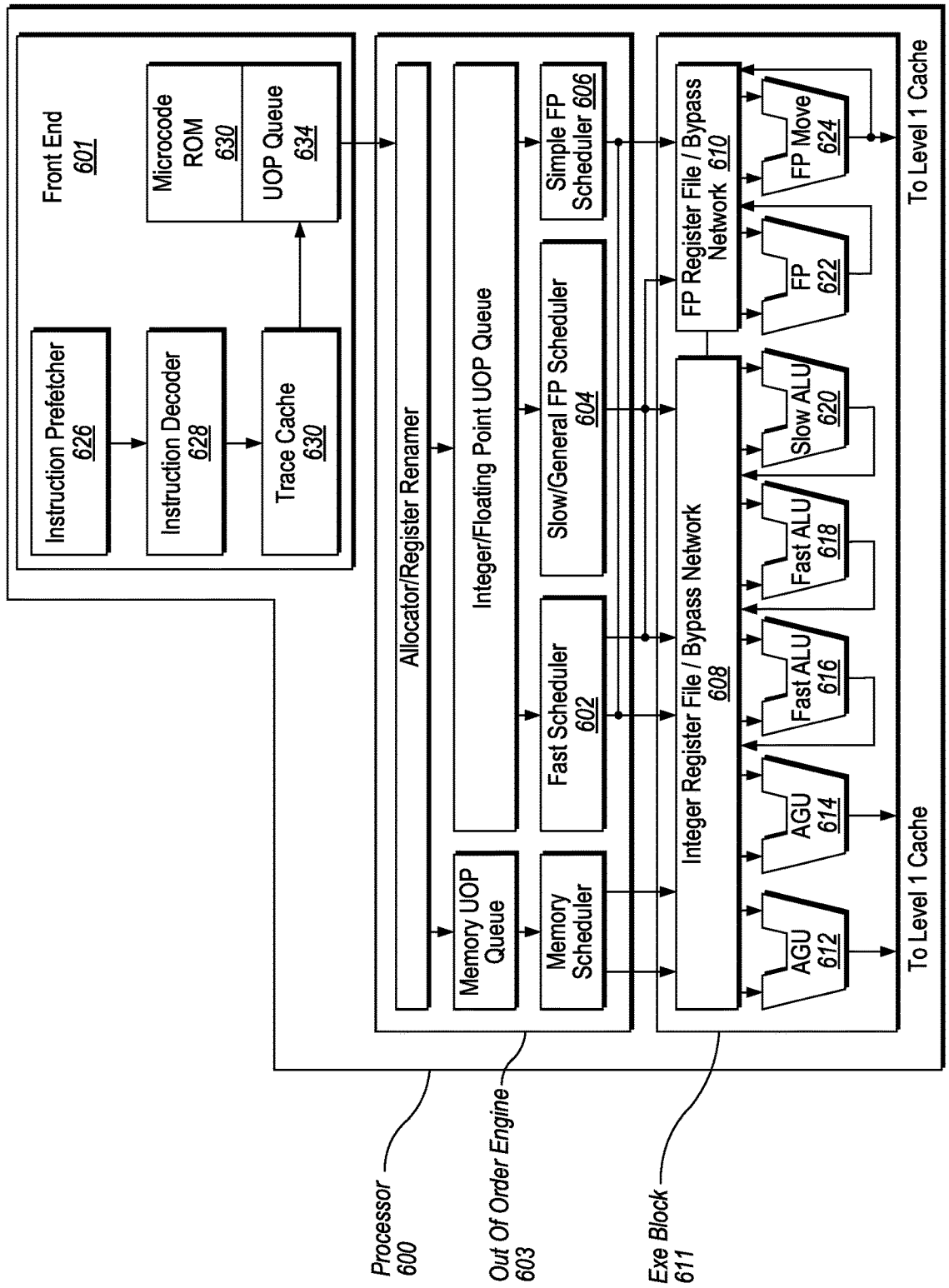
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as data types, such as single and double precision integer and floating point data types. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
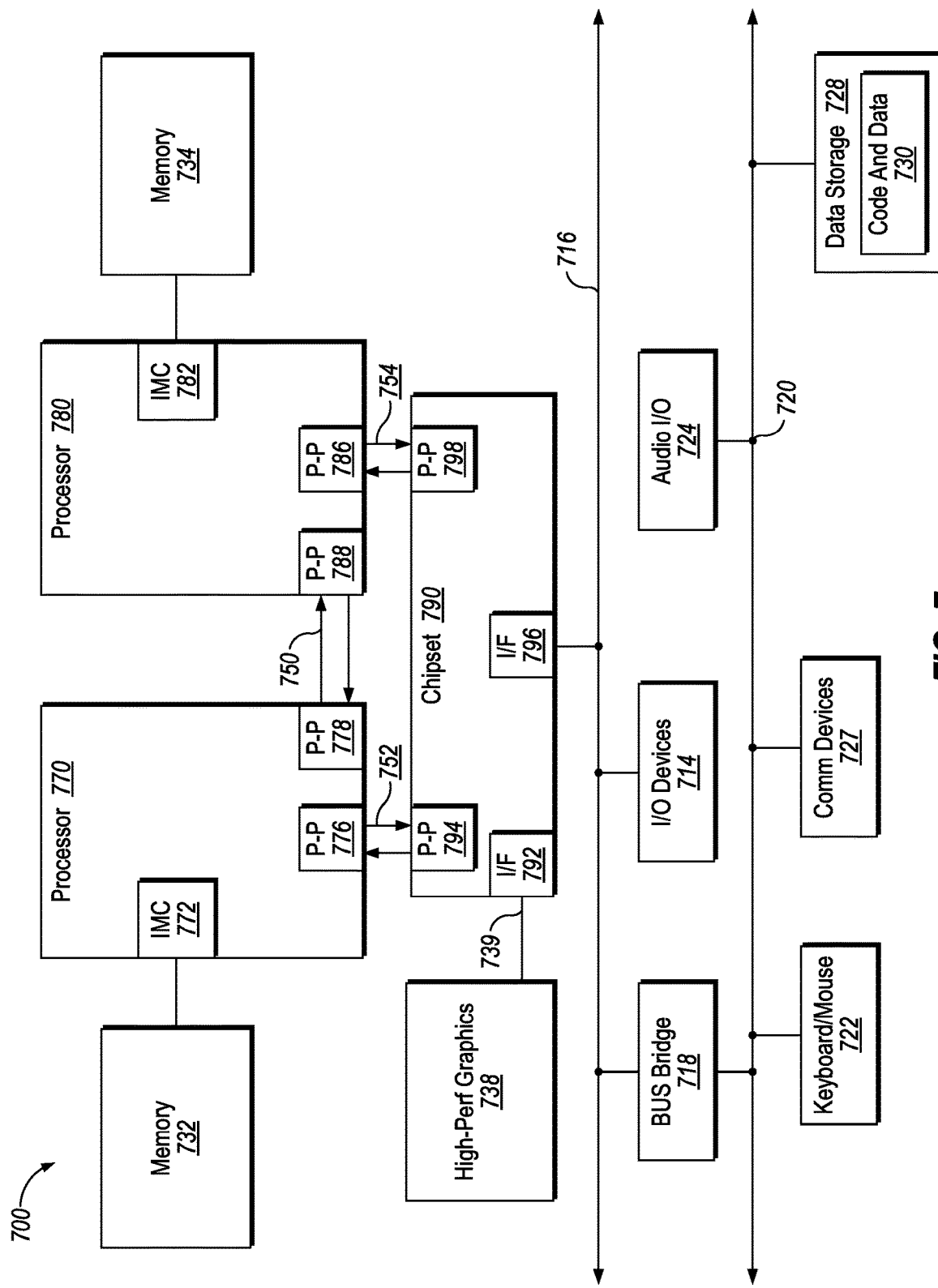
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
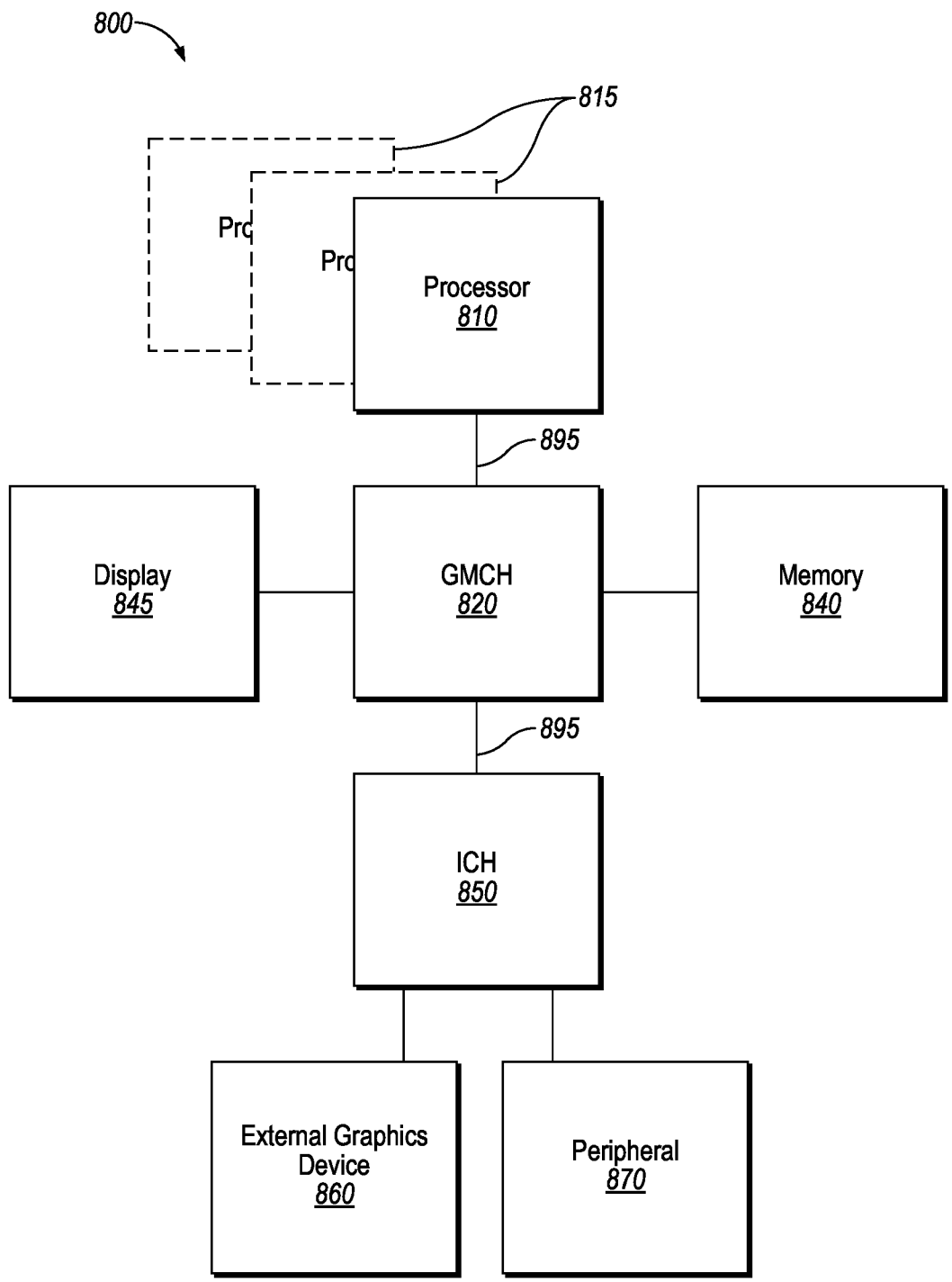
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
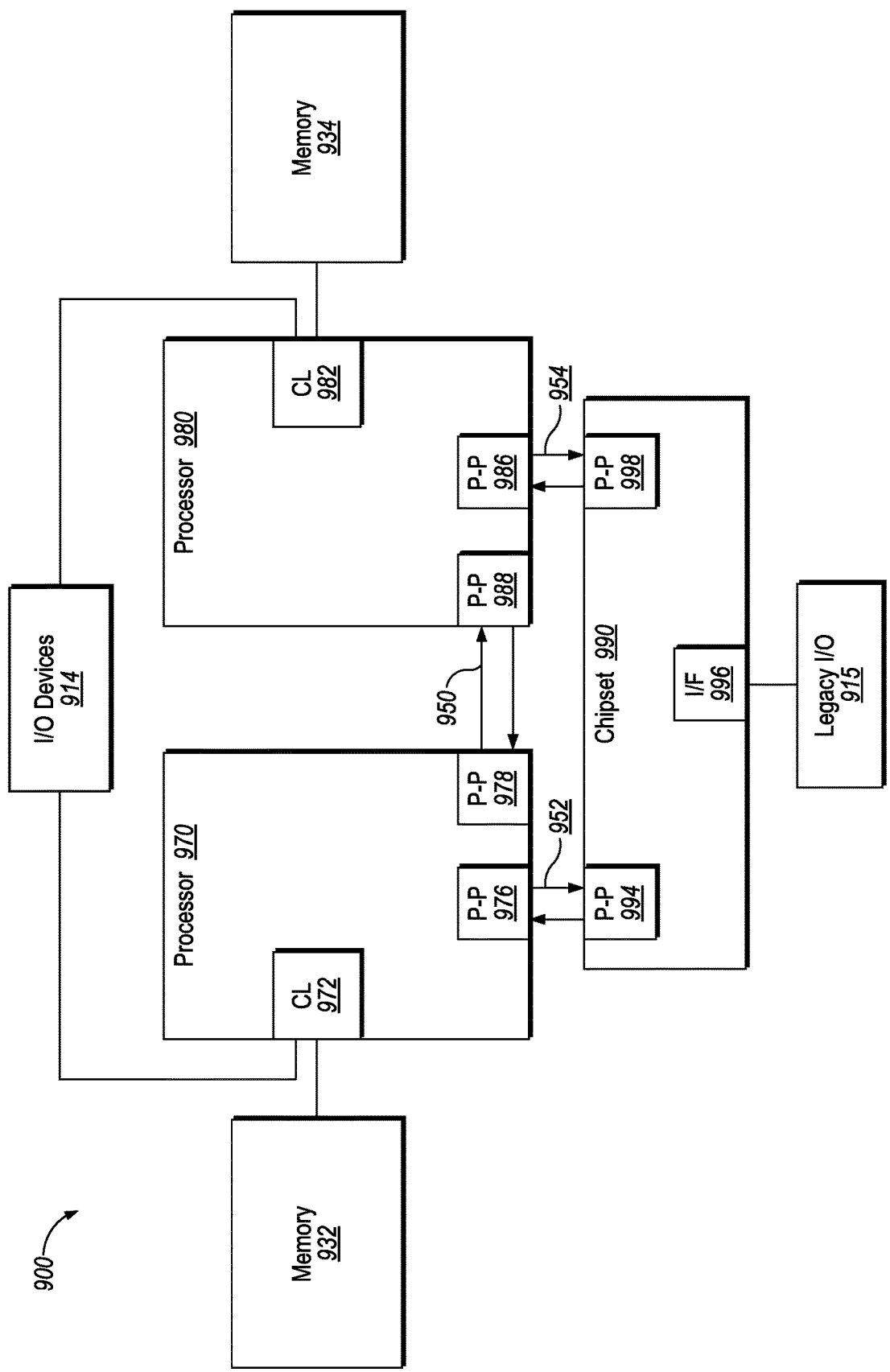
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
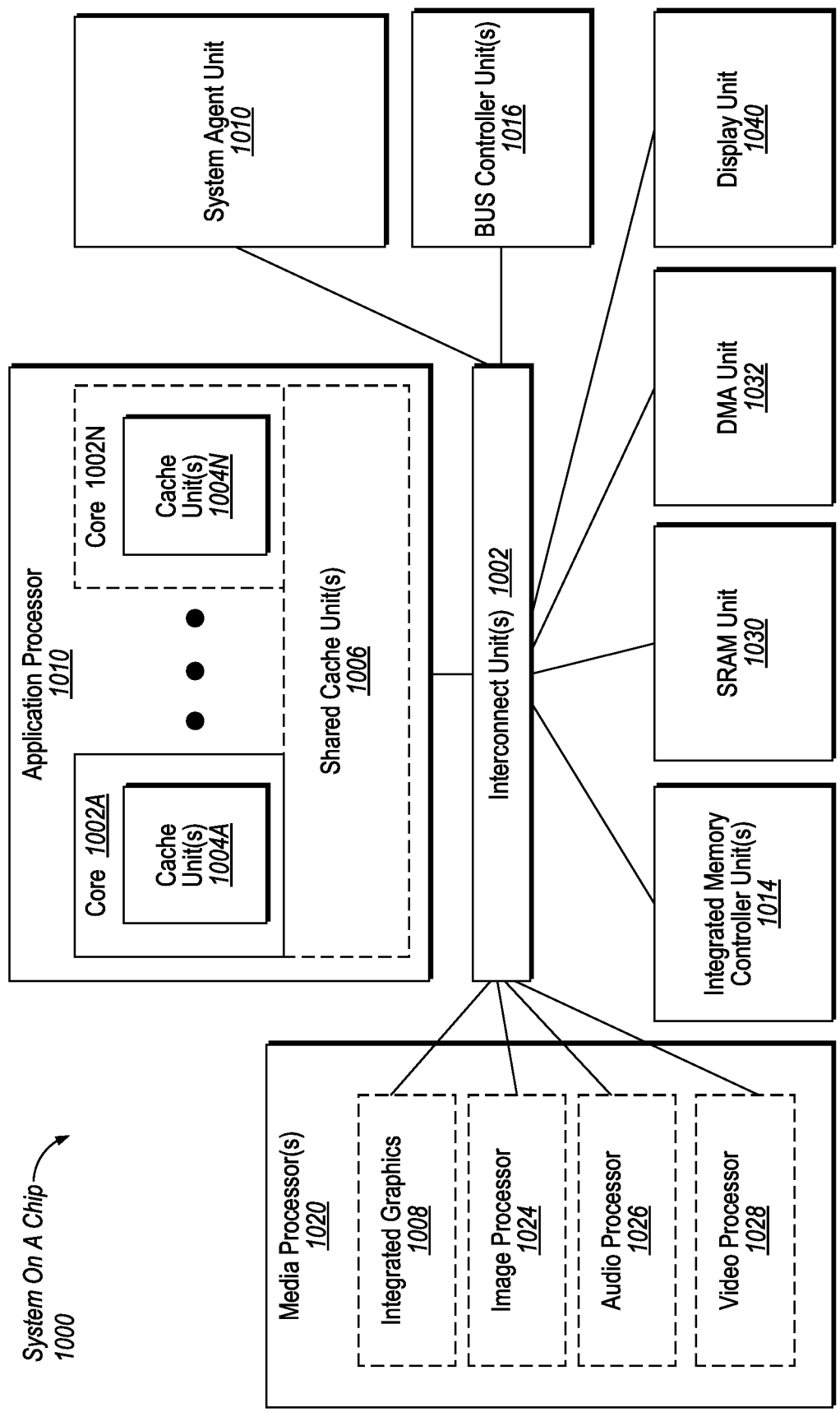
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
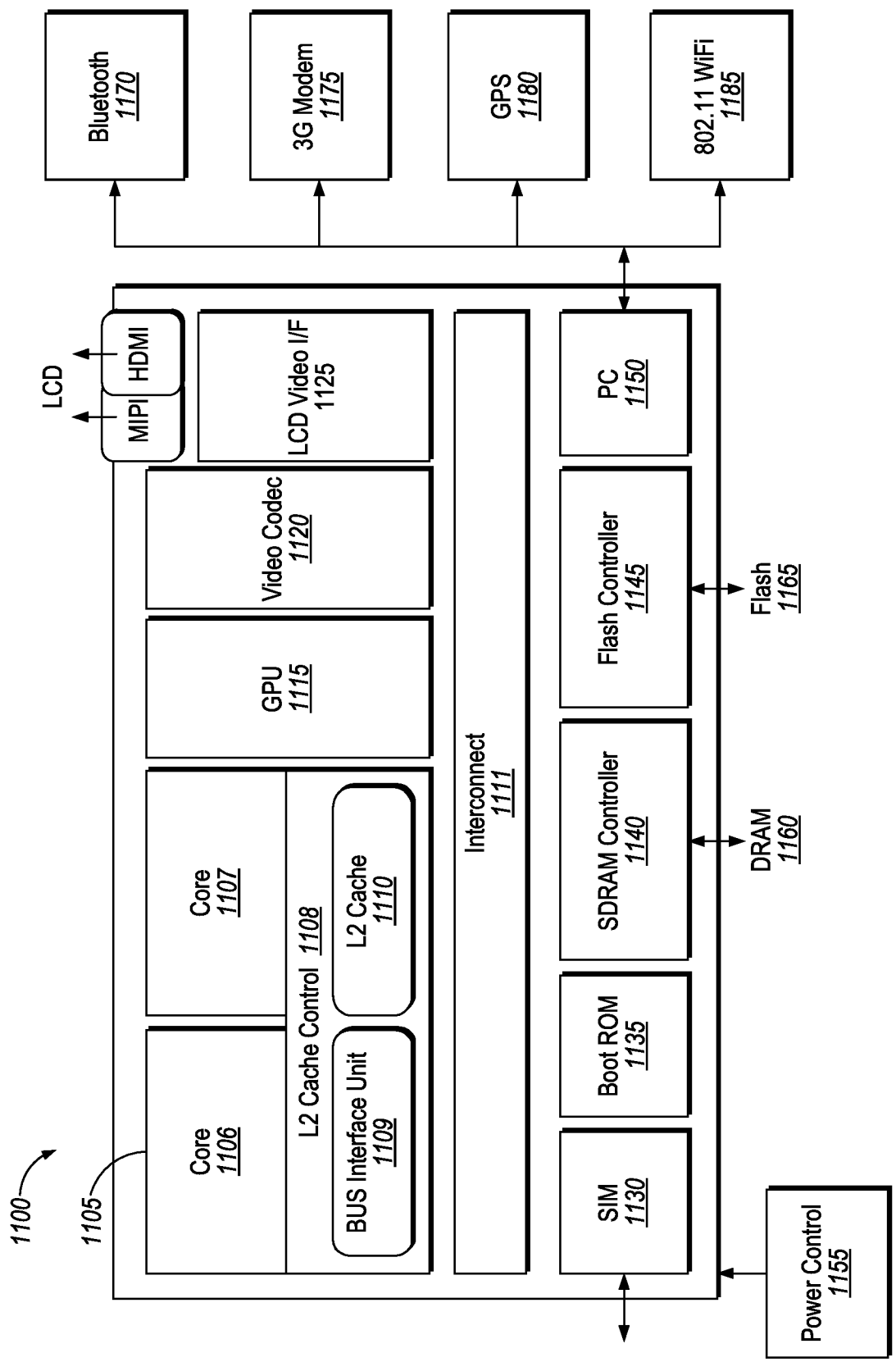
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
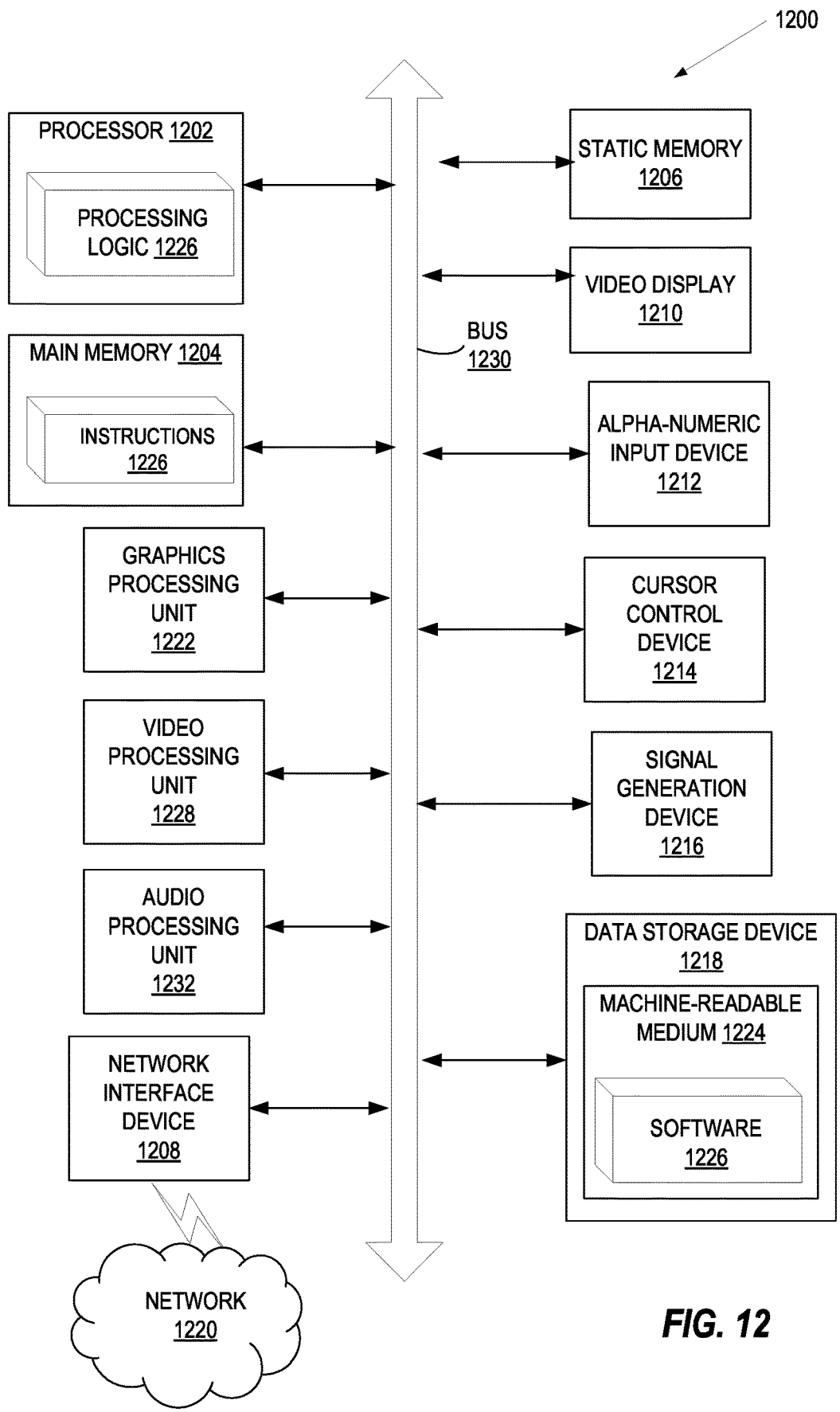
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as the processing device 100 described with respect to FIG. 1.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is processing device including a processing core, coupled to a memory, to execute a task including a code segment identified as being monitored and a kernel recorder, coupled to the processing core via a core interface. The kernel recorder includes a first filter circuit to responsive to determining that the task being executed enters the code segment, set the kernel recorder to a first mode under which the kernel recorder is to record, in a first record, a plurality of memory addresses accessed by the code segment, and responsive to determining that the execution of the task exits the code segment, set the kernel recorder to a second mode under which the kernel recorder is to detect a write operation to a memory address recorded in the first record and record the memory address in a second record.

In Example 2, the subject matter of Example 1 can optionally provide that the write operation under the second mode is caused by a kernel of an operating system executing on the processing device.

In Example 3, the subject matter of Example 1 can optionally provide that the write operation under the second mode is caused by a device driver executing in a context of a kernel of an operating system executing on the processing device.

In Example 4, the subject matter of Example 1 can optionally provide that the write operation under the second mode is caused by a second task executed on a second processing core of the processing device.

In Example 5, the subject matter of any of Examples 1 to 4 can provide that the first filter circuit comprises a hardware address filter to determine an execution flow entry to the code segment by comparing an instruction pointer of the code segment with a specified range.

In Example 6, the subject matter of any of Examples 1 to 4 can provide that the first filter circuit comprises a mode status register to be set by a driver to the first mode in response to detecting an entry to the code segment, and to the second mode in response to detecting an exit from the code segment.

In Example 7, the subject matter of Example 6 can optionally provide that the mode status register includes a plurality of bits, each of the plurality of bits indicating whether a respective processing core of the processing device operates under the first mode or the second mode.

In Example 8, the subject matter of Example 5 can optionally provide that the kernel recorder includes a second filter circuit to, under the first mode, receive data and the plurality of memory addresses associated with the code segment to be written to the memory, and determine whether the data and the plurality of memory addresses are to be recorded in the first record.

In Example 9, the subject matter of Example 8 can optionally provide that the kernel recorder is to record the data and the plurality of memory addresses in the first record responsive to determining that the data and the plurality of memory addresses are associated with a locked variable in the code segment.

In Example 10, the subject matter of Example 8 can optionally provide that the kernel recorder records the data and the plurality of addresses in the first record responsive to determining that the data and the plurality of memory addresses are associated with a device driver.

In Example 11, the subject matter of Example 8 can optionally provide that the second filter circuit is implemented as a hardware address filter.

In Example 12, the subject matter of Example 8 can optionally provide that the kernel recorder includes a third filter circuit that is coupled to the second filter circuit, and the third filter circuit is to determine whether the data and the plurality of memory addresses received at the second filter circuit have been recorded in the first record, and responsive to a determination that the data and the plurality of memory addresses received at the second filter circuit have not been recorded, record the data and the plurality of memory addresses in the first record.

In Example 13, the subject matter of Example 12 can optionally provide that the third filter circuit includes a memory buffer comprising a set of page addresses of the recorded data.

In Example 14, the subject matter of Example 12 can optionally provide that content of the first record is synchronized with a third record stored a second processing core of the processing device.

In Example 15, the subject matter of Example 12 can optionally provide that the kernel recorder includes a first buffer to record a plurality of memory address ranges that are ever read by the processing core under the first mode, and a second buffer to record a plurality of memory address ranges that are ever written by the processing core under the first mode.

In Example 16, the subject matter of Example 15 can optionally provide that responsive to receiving, by the kernel recorder, a cache snoop message indicating that a read transaction from another processing core of the processing device hits a data range stored in the second buffer, write an entry to a log register associated with the processing device and flush the first buffer and the second buffer.

In Example 17, the subject matter of Example 15 can further include a cache, coupled to the kernel recorder, to store a copy of a data item stored in the memory.

In Example 18, the subject matter of Example 17 can optionally provide that responsive to receiving, by the kernel recorder, a cache snoop indicating that a write hits a memory address stored in one of the first or second buffers, the kernel recorder is to write an entry to a log register associated with the processing device and flush one of the first buffer or the second buffer.

In Example 19, the subject matter of Example 17 can optionally provide that responsive to receiving, by the kernel recorder, a cache snoop indicating a write hit with the plurality of memory addresses stored in the second record, the kernel recorder is to evict content of the second recorder to a log register associated with the processing device.

In Example 20, the subject matter of any of Examples 1 to 4 can optionally provide that the processing core executes a plurality of hardware threads that are coupled to a respective kernel recorder.

Example 21 is a method including monitoring, by a kernel recorder coupled to a processing core, execution of a task, determining whether the execution of the task enters or exits a code segment identified as being monitored, responsive to determining that the task being executed enters the code segment, setting the kernel recorder to a first mode under which the kernel recorder is to record, in a first record, a plurality of memory addresses accessed by the code segment, and responsive to determining that the execution of the task exists the code segment, setting the kernel recorder to a second mode under which the kernel recorder is to detect a write operation to a memory address recorded in the first record and record the memory address in a second record.

In Example 22, the subject matter of Example 21 can optionally provide that the write operation under the second mode is caused by a kernel of an operating system executing on the processing device.

Example 23 is an apparatus including means for performing the subject matter of any one of Examples 21 and 22.

Example 24 is a system-on-a-chip (SoC) including a memory and a processing core, coupled to the memory, to execute a task including a code segment identified as being monitored and a kernel recorder, coupled to the processing core via a core interface. The kernel recorder includes a first filter circuit to responsive to determining that the task being executed enters the code segment, set the kernel recorder to a first mode under which the kernel recorder is to record, in a first record, a plurality of memory addresses accessed by the code segment, and responsive to determining that the execution of the task exits the code segment, set the kernel recorder to a second mode under which the kernel recorder is to detect a write operation to a memory address recorded in the first record and record the memory address in a second record.

In Example 25, the subject matter of Example 24 can optionally provide that the write operation under the second mode is caused by a kernel of an operating system executing on the processing device.

In Example 26, the subject matter of Example 24 can optionally provide that the write operation under the second mode is caused by a device driver executing in a context of a kernel of an operating system executing on the processing device.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing device, comprising:
   a memory;
   a processing core, coupled to the memory, to execute a task comprising a code segment identified as being monitored; and
   a kernel recorder, coupled to the processing core via a core interface, the kernel recorder comprising a first filter circuit to:
   responsive to determining that the task being executed enters the code segment, set the kernel recorder to a first mode under which the kernel recorder is to record, in a first record, a plurality of memory addresses accessed by the code segment; and
   responsive to determining that the execution of the task exits the code segment, set the kernel recorder to a second mode under which the kernel recorder is to detect a write operation to a memory address recorded in the first record and record the memory address in a second record.

2. The processing device of claim 1, wherein the write operation under the second mode is caused by a kernel of an operating system executing on the processing device.

3. The processing device of claim 1, wherein the write operation under the second mode is caused by a device driver executing in a context of a kernel of an operating system executing on the processing device.

4. The processing device of claim 1, wherein the write operation under the second mode is caused by a second task executed on a second processing core of the processing device.

5. The processing device of claim 1, wherein the first filter circuit comprises a hardware address filter to determine an execution flow entry to the code segment by comparing an instruction pointer of the code segment with a specified range.

6. The processing device of claim 1, wherein the first filter circuit comprises a mode status register to be set by a driver to the first mode in response to detecting an entry to the code segment, and to the second mode in response to detecting an exit from the code segment.

7. The processing device of claim 5, wherein the kernel recorder includes a second filter circuit to, under the first mode,
   receive data and the plurality of memory addresses associated with the code segment to be written to the memory, and
   determine whether the data and the plurality of memory addresses are to be recorded in the first record.

8. The processing device of claim 7, wherein the kernel recorder is to record the data and the plurality of memory addresses in the first record responsive to determining that the data and the plurality of memory addresses are associated with a locked variable in the code segment.

9. The processing device of claim 7, wherein the kernel recorder records the data and the plurality of addresses in the first record responsive to determining that the data and the plurality of memory addresses are associated with a device driver.

10. The processing device of claim 7, wherein the second filter circuit is implemented as a hardware address filter.

11. The processing device of claim 7, wherein the kernel recorder includes a third filter circuit that is coupled to the second filter circuit, and the third filter circuit is to:
    determine whether the data and the plurality of memory addresses received at the second filter circuit have been recorded in the first record, and
    responsive to a determination that the data and the plurality of memory addresses received at the second filter circuit have not been recorded, record the data and the plurality of memory addresses in the first record.

12. The processing device of claim 11, wherein the third filter circuit includes a memory buffer comprising a set of page addresses of the recorded data.

13. The processing device of claim 11, wherein content of the first record is synchronized with a third record stored a second processing core of the processing device.

14. The processing device of claim 11, wherein the kernel recorder includes a first buffer to record a plurality of memory address ranges that are ever read by the processing core under the first mode, and a second buffer to record a plurality of memory address ranges that are ever written by the processing core under the first mode.

15. The processing device of claim 14, wherein responsive to receiving, by the kernel recorder, a cache snoop message indicating that a read transaction from another processing core of the processing device hits a data range stored in the second buffer, write an entry to a log register associated with the processing device and flush the first buffer and the second buffer.

16. The processing device of claim 6, wherein the mode status register includes a plurality of bits, each of the plurality of bits indicating whether a respective processing core of the processing device operates under the first mode or the second mode.

17. A method, comprising:
    monitoring, by a kernel recorder coupled to a processing core, execution of a task;
    determining whether the execution of the task enters or exits a code segment identified as being monitored;
    responsive to determining that the task being executed enters the code segment, setting the kernel recorder to a first mode under which the kernel recorder is to record, in a first record, a plurality of memory addresses accessed by the code segment; and
    responsive to determining that the execution of the task exists the code segment, setting the kernel recorder to a second mode under which the kernel recorder is to detect a write operation to a memory address recorded in the first record and record the memory address in a second record.

18. The method of claim 17, wherein the write operation under the second mode is caused by a kernel of an operating system executing on the processing core.

19. A system-on-a-chip (SoC) comprising:
    a memory;
    a processing core, coupled to the memory, to execute a task comprising a code segment identified as being monitored; and a kernel recorder, coupled to the processing core via a core interface, the kernel recorder comprising a first filter circuit to:
  responsive to determining that the task being executed enters the code segment, set the kernel recorder to a first mode under which the kernel recorder is to record, in a first record, a plurality of memory addresses accessed by the code segment; and
  responsive to determining that the execution of the task exits the code segment, set the kernel recorder to a second mode under which the kernel recorder is to detect a write operation to a memory address recorded in the first record and record the memory address in a second record.

20. The SoC of claim 19, wherein the write operation under the second mode is caused by a kernel of an operating system executing on the processing core.

\* \* \* \* \*